United States Patent
Dahl et al.

(10) Patent No.: US 9,910,152 B2
(45) Date of Patent: Mar. 6, 2018

(54) USER INTERFACES FOR ELECTRONIC DEVICES

(71) Applicant: Elliptic Laboratories AS, Oslo (NO)

(72) Inventors: Tobias Gulden Dahl, Oslo (NO); Cato Syversrud, Oslo (NO); Hans Jørgen Bang, Oslo (NO)

(73) Assignee: ELLIPTIC LABORATORIES AS, Oslo (NO)

( * ) Notice: Subject to any disclaimer, the term of this patent is extended or adjusted under 35 U.S.C. 154(b) by 602 days.

(21) Appl. No.: 14/036,908

(22) Filed: Sep. 25, 2013

(65) Prior Publication Data

US 2014/0029384 A1    Jan. 30, 2014

Related U.S. Application Data

(63) Continuation of application No. PCT/GB2012/050674, filed on Mar. 27, 2012.

(30) Foreign Application Priority Data

Apr. 1, 2011  (GB) .................................. 1105587.8

(51) Int. Cl.
  *G01S 15/02*  (2006.01)
  *G06F 1/16*  (2006.01)
  *G06F 3/041*  (2006.01)
  *G06F 3/043*  (2006.01)
  *G06F 3/01*  (2006.01)
(52) U.S. Cl.
  CPC .......... *G01S 15/02* (2013.01); *G06F 1/1626* (2013.01); *G06F 3/011* (2013.01); *G06F 3/017* (2013.01); *G06F 3/043* (2013.01); *G06F 3/0418* (2013.01)

(58) Field of Classification Search
  USPC ......................................................... 367/95
  See application file for complete search history.

(56) References Cited

U.S. PATENT DOCUMENTS

| | | | |
|---|---|---|---|
| 7,653,883 B2 * | 1/2010 | Hotelling et al. ............ | 715/863 |
| 8,787,113 B2 * | 7/2014 | Turbahn et al. .............. | 367/118 |
| 2006/0161871 A1 | 7/2006 | Hotelling et al. | |
| 2007/0055155 A1 * | 3/2007 | Owen ...................... | A61B 8/00 600/439 |

(Continued)

FOREIGN PATENT DOCUMENTS

| | | |
|---|---|---|
| EP | 1 808 752 | 7/2007 |
| JP | 2004-272343 | 9/2004 |

(Continued)

OTHER PUBLICATIONS

International Search Report dated Aug. 7, 2012 from International Application No. PCT/GB2012/050674.

(Continued)

*Primary Examiner* — James R Hulka
(74) *Attorney, Agent, or Firm* — Beyer Law Group LLP

(57) ABSTRACT

An electronic device comprises a transmitter 6 for transmitting ultrasonic signals, a receiver 8 for receiving reflections 20 of said ultrasonic signals, wherein the device is adapted to control a function thereof in dependence on said received reflections, the device further comprising means for providing to a user an indication 14 of the presence of signals or noise which could interfere with said reflections.

16 Claims, 3 Drawing Sheets

(56) References Cited

U.S. PATENT DOCUMENTS

| | | | |
|---|---|---|---|
| 2007/0139392 A1* | 6/2007 | Kim | 345/173 |
| 2008/0318682 A1* | 12/2008 | Rofougaran | G01S 13/426 463/39 |
| 2009/0031811 A1* | 2/2009 | Georgeson | G01L 5/246 73/588 |
| 2009/0189020 A1* | 7/2009 | Bilgram | B64D 15/20 244/134 F |
| 2010/0110273 A1 | 5/2010 | Turbahn et al. | |
| 2011/0032801 A1* | 2/2011 | Onishi | G01S 7/527 367/152 |
| 2011/0088473 A1* | 4/2011 | Nelson | G01L 5/246 73/602 |
| 2012/0105314 A1 | 5/2012 | Lee | |
| 2012/0262573 A1* | 10/2012 | Bridges | G01C 15/002 348/135 |
| 2012/0263017 A1* | 10/2012 | Iwamoto | G01S 15/96 367/88 |

FOREIGN PATENT DOCUMENTS

| | | |
|---|---|---|
| WO | WO 2009/147398 | 12/2009 |
| WO | WO 2011/010760 | 1/2011 |
| WO | WO 2011/036486 | 3/2011 |

OTHER PUBLICATIONS

Written Opinion dated Aug. 7, 2012 from International Application No. PCT/GB2012/050674.

* cited by examiner

USER INTERFACES FOR ELECTRONIC DEVICES

This application is a continuation of International Application No. PCT/GB2012/050674, filed on Mar. 27, 2012 which claims priority to GB Application No. 1105587.8, filed on Apr. 1, 2011 both of which are hereby incorporated by reference in their entirety.

This invention relates to methods and apparatus by which a user can interact with an electronic device and it relates particularly to interfaces which involve characterising the motion of one or more objects such as a human finger or hand.

Proposals have been made for finger tracking using ultrasonic transmitters in order to enable touchless interaction with a computer device. An example of one such proposal is disclosed in US Patent Application US 2006/161871. However, the Applicant has appreciated that the prior proposals have shortcomings. In particular, they can be sensitive to interference from echoes caused by other objects and from active sources of noise in the ultrasonic spectrum. Interference is particularly problematic in acoustic tracking systems as compared with optical ones, due to the wider dispersion characteristics and much lower speed of sound waves.

The present invention aims to address these issues and when viewed from a first aspect provides an electronic device comprising a transmitter for transmitting ultrasonic signals, a receiver for receiving reflections of said ultrasonic signals, wherein the device is adapted to control a function thereof in dependence on said received reflections, the device further comprising means for providing to a user an indication of the presence of signals or noise which could interfere with said reflections.

Thus it will be seen that in accordance with the invention the user of a touchless-enabled device employing ultrasound is notified of any potential interference which might hinder or prevent the correct operation of the touchless interface. This allows the user to take avoiding action such as moving away from a source of noise or waiting until the source of noise has gone. This is considered to be preferable to the situation in which the touchless interface simply does not work or does not work reliably which can lead to frustration on the part of the user and a presumption of a malfunction in the device.

The indicating means could take any of a number of different forms. For example it could comprise a visual, audible or haptic indication or any combination of these.

The device could be arranged simply to give an indication of the presence or absence of interference beyond a particular threshold, but in a set of preferred embodiments the device is configured to give an indication of the relative level of interference. This could, for example, comprise a plurality of thresholds with a different indication being given for each threshold. In one non-limiting example, where the indication comprises a graphical icon on a display screen visible to a user, the icon might comprise successive parts e.g. of differing size which are progressively displayed or extinguished depending upon the level of potential interference—e.g. in the manner of the familiar signal strength bar chart known from mobile communication devices.

There are different types of potential interference. These include: signals from other devices of the same type as the first device and reflections thereof; signals from other devices employing ultrasound to perform a function but of a different type to the first device, and reflections thereof; and random or environmental noise which spans the relevant part of the ultrasonic frequency band. Preferably the first device is configured to give an indication of the presence, or preferably level, of potential interference of any of the above types. In a set of embodiments, the first device is configured to distinguish at least one of the three types of interference mentioned above. The first device could, for example, recognise the transmissions from a similar device and could give a different indication and/or perform a different action than when more general signals or noise is detected. This is useful as the user may be able to take different mitigating action depending upon the type of interference. For example, in the case of interference from another device of similar type, the user could simply move away from the device whereas in the case of environmental noise, the user could switch off a device causing the interference or cease an action such as jangling keys that gives rise to interference.

As well as giving an indication to a user that the potential for interference is present, the first device may also carry out an action in response to detection of the potential interference. Such an action might only be carried out at a certain threshold and such a threshold might be different from any thresholds applying to the type of indication given. The action could comprise switching off the touchless interaction mode until the potential interference has passed, increasing the power of transmission in order to increase the power of the signals reflected from the input object accordingly or the action could comprise initiating or altering a collision-avoidance algorithm. Again, the action could be dependent on the type of potential interference detected. For example, the device might seek to initiate a collaborative collision avoidance algorithm if the potential interference is identified as coming from a similar device, but if the potential interference is identified as being environmental noise, it might simply increase its transmission power.

It has previously been discussed that the indication of potential interference recited herein may indicate more than simply the presence or absence of potential interference but may, for example, also indicate the relative level of the interference and/or the nature of the potential interference (another device, noise etc). Another possibility comprising a set of embodiments of the invention is that the first device gives an indication to the user of the direction and/or distance to the source of interference where the device is able to establish this. Clearly the benefit of such arrangements is that it allows a user a better opportunity to take more effective mitigating action if the source of the potential interference is known.

As mentioned above, the nature of the indication could take many different forms or indeed a combination of forms. In a set of preferred embodiments the indication comprises a graphical indication on a display screen of the device. In one set of such embodiments, the graphical indication comprises a specific indicator as has been mentioned above. However, other possibilities are envisaged. For example, the graphical indication could comprise altering the way in which other information is displayed on the screen. One example of this would be to "grey" options if too much interference is present for them to be selected or used. Another example would be to cause text or images on the screen to fade, vibrate, become distorted, change colour, become more or less transparent, become obscured etc.

The first device could determine the presence of potential interference in a number of different ways. In a relatively straightforward set of embodiments, the first device could simply measure the total energy of the signals received and relate this to one or more thresholds based on the expected energy level associated with signals reflected from the normal input object. In another set of embodiments, the first device could be arranged to take into account the frequency of the energy it receives. This could be relatively crude—e.g. measuring energy only within a particular frequency band or could be more sophisticated by performing a Fourier transform and analysing the frequency spectrum of received energy and, for example, looking for unexpected peaks.

In another set of embodiments, the first device is arranged to determine potential interference from signals received within a defined time window which would typically correspond to the maximum time of flight for signals transmitted from the transmitter, reflected from an object of interest at the farthest extent of a predefined zone of sensitivity, and to travel back to the receiver. This is beneficial since it is only signals from other sources which are received in this window which in practice give rise to a risk of interference. Signals received outside this window can simply be ignored, or at least not treated as inputs to the device.

It should be appreciated that the sets of embodiments described above are not mutually exclusive and any combination thereof may be employed in a particular application. In another set of embodiments, also not mutually exclusive, the first device is arranged to apply a deconvolution to the received signals based on the transmitted signals. The advantage of this is that it allows more easily a focus on the time window corresponding to the region of interest (the times of flight corresponding to reflections from the object when it is somewhere within a predefined zone of sensitivity). This also effectively removes signals which are outside the frequency band used by the transmission. Signals outside the transmitted frequency band are unlikely to have arisen from reflections of the transmitted signals.

In a preferred set of embodiments, the first device is arranged to suspend its own transmissions and to listen for and analyse the signals received during this period which, of course, will be due entirely to potentially interfering signals and noise. This ceasing of transmissions could be done at regular intervals or could be done randomly. The rate or average rate at which transmission is suspended in this way may be chosen to suit the circumstances and may be fixed or variable. For example, it may be beneficial to sample the potential interference more frequently when it has previously been detected that a significant amount of interference exists in order that an indication can rapidly be given when the interference is reduced or no longer exists. This will automatically be the case in arrangements in which the first device switches off its transmitter in the presence of excessive interference.

Certain preferred embodiments of the invention will now be described, by way of example only, with reference to the accompanying drawings in which.

Figure 1:
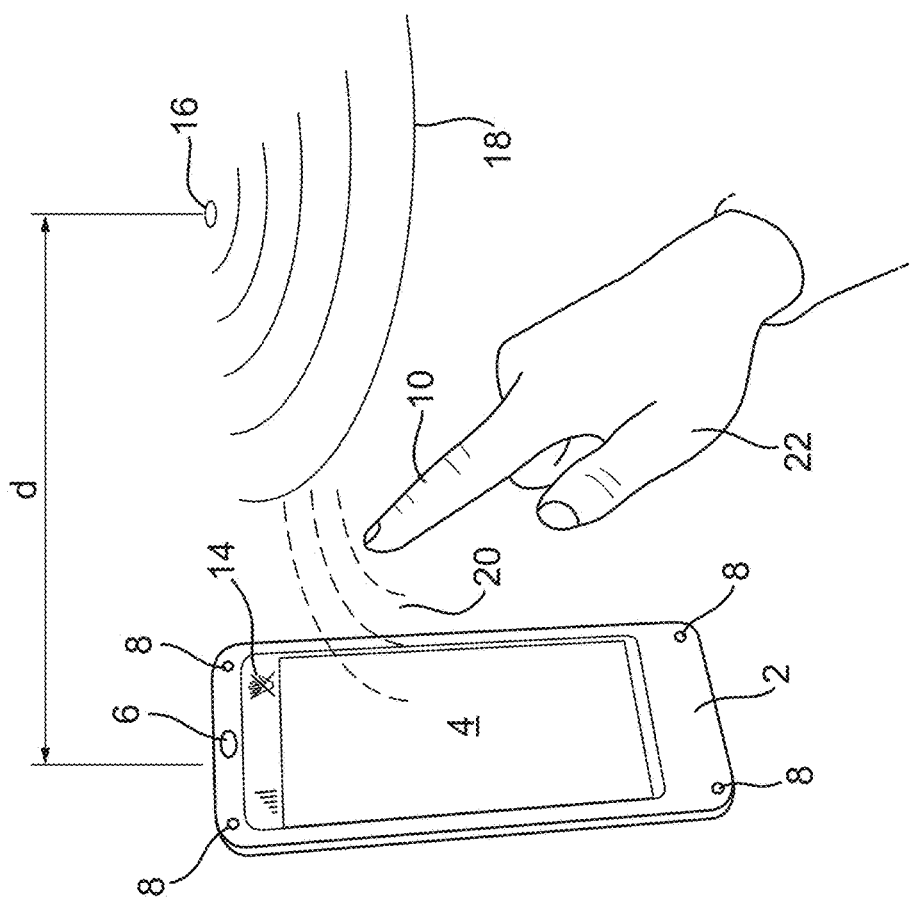
FIG. 1 shows a device embodying the invention operating with and without interference.
Figure 1:
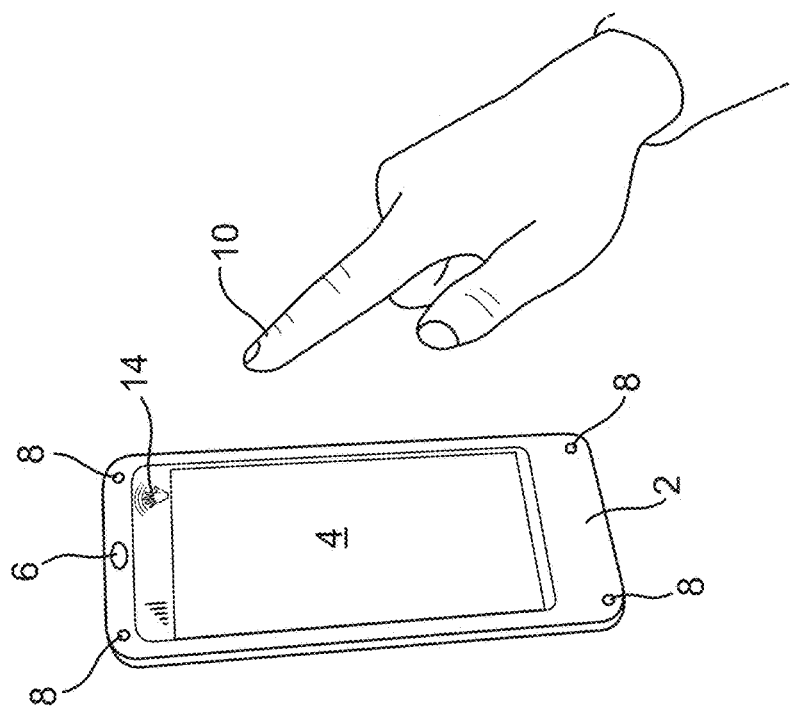

FIG. 1 shows a portable electronic device 2 such as a smart phone. The device 2 comprises a display screen 4 which might also act as a touch screen. However, the device 4 also comprises an ultrasonic transmitter 6 just above the screen 4 and a set of four ultrasonic receivers 8 arranged around the corners of the screen 4. The ultrasonic transmitter and receivers 6, 8 enable a touchless interaction mode in which some functions of the device 2 can be controlled by movement of a user's finger 10 by analysing the reflections of signals transmitted by the transmitter 6 at the receivers 8. Such touchless control of electronic devices is known per se.

In the top right-hand corner of the screen 4 is an icon 12 indicating that the touchless interaction mode is available for use since there are no potentially interfering signals or noise in this situation. In the situation shown in the right-hand side of FIG. 1 however, there is shown a source of ultrasonic interference 16 at a distance d from the device 2. The signals 18 from the interference source 16 will be received directly by the receivers 8 of the portable device 2 as will reflections 20 of the interfering signals 18 from the users hand 22 and finger 10. This causes the screen icon 14 to change to a different form indicating that the touchless interaction mode is no longer available.

Figure 2:
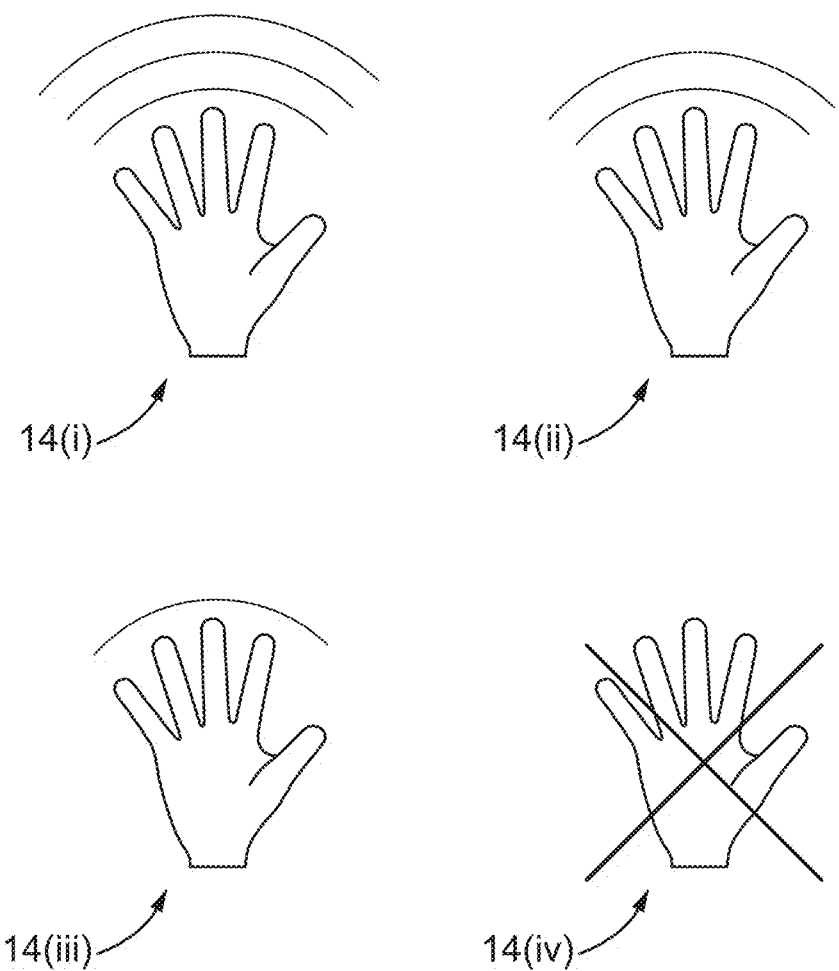
FIG. 2 shows four possible states of a graphical interference icon.

FIG. 2 shows in more detail how the icon 14 can change depending on the level of interference. Thus icon 14(*i*) indicates no or minimal interference such that touchless interaction is fully available. Icon 14(*iv*) indicates that touchless interaction mode is not available due to the level of interference. Icons 14(*ii*) and 14(*iii*) indicate intermediate levels of interference. The different levels of interference giving rise to the different icons 14 will now be described in further detail below.

In an exemplary embodiment of the determination of the level of interference, the device 2 is programmed so as to operate a touchless interface by sending a regular ultrasonic chirp signal (i.e. one whose frequency rises or falls) via the transmitter 6 to be reflected by the user's finger 10 and received by the receivers 8. By studying the signals received by one or more of the receivers and their change over time, characteristics of the position and/or motion of the user's hand can be deduced and this can be used to control a function of the device. Such operation is know per se in the art.

However, in order to assess the level of interference, then every certain number of frames, say every 10 frames, the transmitter 6 does not transmit a chirp but the receivers still listen for ultrasonic signals received during the ensuing frame (or several frames). The signals received via the receivers 8 are deconvolved as usual and then the energy in the deconvolved signal is calculated both over the entire frame and also over a time window that corresponds to a region of interest. The region of interest is the spatial region around the mobile device 2 within which it is intended that the input object i.e. the user's finger 10 can be used to control the device 2. The maximum distance that the user's finger 10 can be from the transmitter 6 and receivers 8 and still be within the aforementioned region of interest determines a maximum time of flight for signals passing from the transmitter 6 to the receivers 8 after reflection from the finger 10. The region of interest therefore defines a time window during which reflections from the finger 10 should be analysed, whereas signals received during the rest of the frame can be disregarded.

By computing the energy of the deconvolved signal and not the received signal directly, two advantages are realised. First, it is possible to focus specifically on the region of interest; and second any content within the signal which is not within the frequency band of the transmitted signal is effectively removed.

Classification of the interference situation which is achieved by performing these steps gives two interference measures. The first gives the interference level within the whole frame and the second gives the interference level within the region of interest only. Based on these a rough classification into four different classes can be made corresponding to the four different forms of the icon 14 shown in FIG. 2. Thus icon 14(*i*) may correspond to a situation in which there is little interference within in the entire frame. Preferably this is determined by comparing the energy in the frame when no signal has been transmitted with the energy in the previous frame in which a signal was transmitted. If the difference is more than 10 decibels it is determined that there is little interference in the frame as a whole.

The second situation corresponding to icon 14(*ii*) is when there is interference within the frame as a whole but there is little interference within the region of interest. In this scenario, for example, the energy in the frame as a whole (without transmission) may be greater than the energy in the preceding frame (with transmission) minus 10 decibels, but the energy in the region of interest (without transmission) is less than the energy in the region of interest in the previous frame (with transmission) minus 7 decibels.

The third scenario corresponding to icon 14(*iii*) is where there is a moderate level of interference within the region of interest. This might correspond to the energy in the region of interest being somewhere between the energy in the region of interest in the previous frame (with transmission) minus 7 decibels and the energy in the region of interest in the previous frame minus 2 decibels.

Finally, if there is considerable interference within the region of interest e.g. the energy in the region of interest without transmission is greater than the energy in the region of interest with transmission minus 2 decibels, icon 14(*iv*) is displayed indicating that the interference is too high to allow the touchless interaction mode to be used. Of course, as well as giving the indication described above to the user, other action may be associated with the various interference levels. For example, in level four (corresponding to icon 14(*iv*) the transmitter 6 may be switched off until the interference has reduced.

Figure 3:
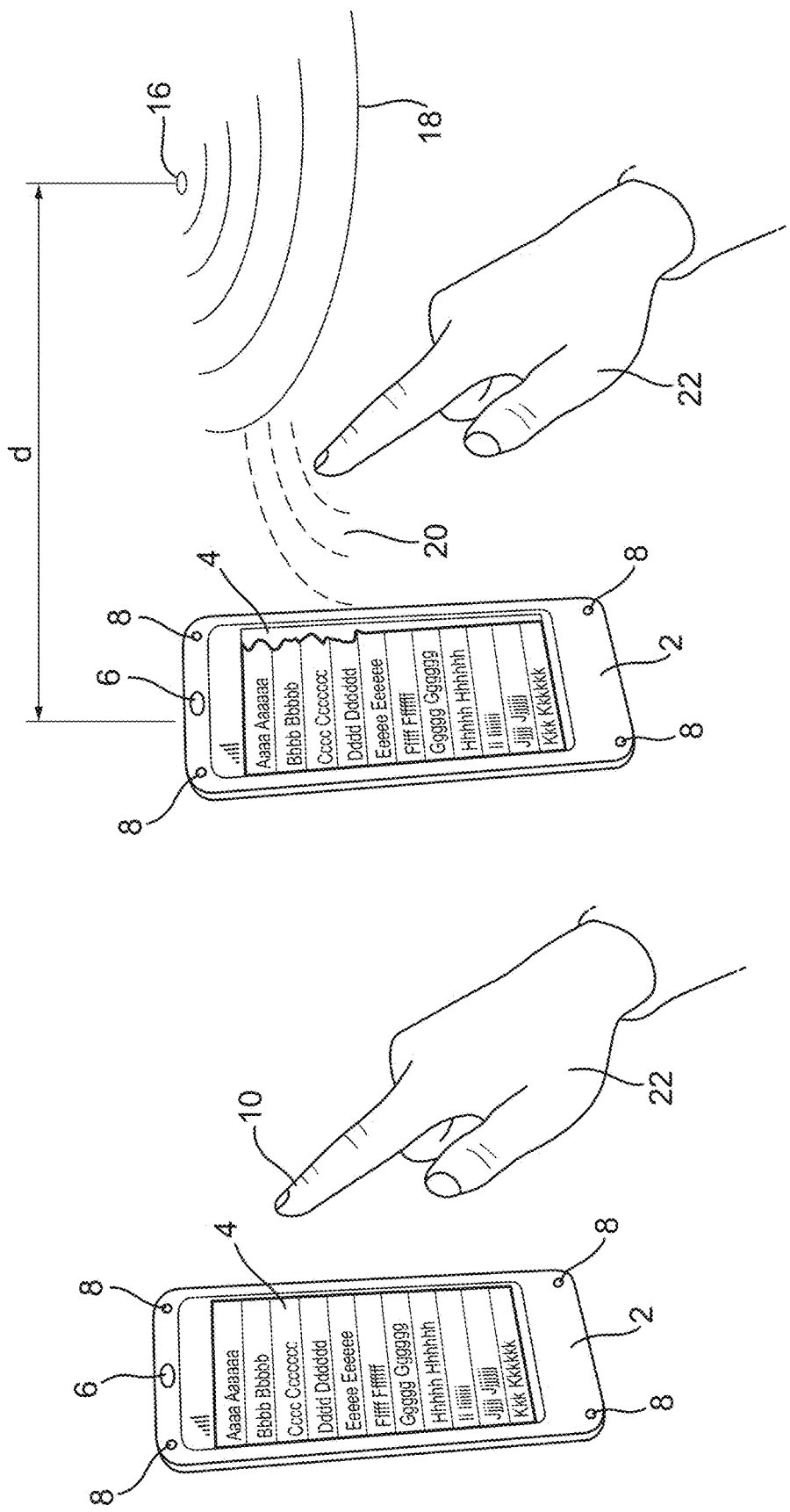
FIG. 3 shows how interference is indicated on a display screen in another embodiment of the invention.

FIG. 3 shows an alternative way in which the presence or degree of interference can be communicated to a user. By comparing the information on the screen 4 of the device in both cases, it can be seen that in the case where there is interference (shown on the right-hand side of the Figure) the screen image is distorted. The degree of distortion may correspond to the level of interference in a manner similar to the different icons shown in FIG. 2.

Of course, it will be appreciated by those skilled in the art that there are many possible alternative ways of indicating both the presence and degree of interference to a user and these could involve other visual indications such as warning lights or the content of the screen flashing, changing colour, becoming fuzzy; and non-visual indicators such as audible indications, haptic indications etc. Furthermore, as well as just indicating the level of interference, more detailed information could be given such as the type of interfering device, the distance d to the source of interference and/or direction in which the interference is coming from to enable the user to take better mitigating action.

The invention claimed is:

1. An electronic device comprising a transmitter configured to transmit ultrasonic signals, a receiver configured to receive reflections of said ultrasonic signals, wherein the device is adapted to control a function thereof in dependence on said received reflections, the device being arranged to measure one of a plurality of levels of interference from signals or noise to give a measured level of interference, the device further comprising an indicating arrangement providing to a user an indication of a presence of said signals or noise, wherein the indicating arrangement is configured to give an indication of said measured level of interference and wherein the indicating arrangement is further configured to indicate at least one of a direction to a source of interference and a distance to a source of interference.

2. A device as claimed in claim 1 configured to give an indication of the presence of potential interference of any one or more of interference types comprising: signals from other devices of the same type as the first device and reflections thereof; signals from other devices employing ultrasound to perform a function but of a different type to the device, and reflections thereof; and random or environmental noise which spans a part of an ultrasonic frequency band used by the device.

3. A device as claimed in claim 2 configured to distinguish at least one of the interference types.

4. A device as claimed in claim 3 arranged to recognize transmissions from a similar device and give a different indication and/or perform a different action than when one of said other types of interference is detected.

5. A device as claimed in claim 1 arranged to carry out an action if said signals or noise exceeds a threshold.

6. A device as claimed in claim 5 wherein said action is selected from a group comprising: switching off a touchless interaction mode so that said function is no longer controlled by said received reflections; increase a power at which said signals are transmitted; or initiating or altering a collision-avoidance algorithm.

7. A device as claimed in claim 1 wherein the indication comprises a graphical indication on a display screen of the device.

8. A device as claimed in claim 7 wherein said indication comprises a graphical icon.

9. A device as claimed in claim 8 wherein the icon comprises successive parts which are progressively displayed or extinguished depending upon a level of potential interference.

10. A device as claimed in claim 7 wherein the graphical indication comprises an alteration to a way in which other information is displayed on the screen.

11. A device as claimed in claim 1 arranged to measure a total energy of signals received and relate this to one or more thresholds based on an expected energy level associated with signals reflected from an input object.

12. A device as claimed in claim 1 arranged to arranged to take into account a frequency of energy it receives.

13. A device as claimed in claim 1 arranged to determine potential interference from signals received within a defined time window.

14. A device as claimed in claim 1 arranged to apply a de-convolution to the received reflections based on the transmitted signals.

15. A device as claimed in claim 1 arranged to suspend its own transmissions and to listen for and analyse signals received during a time window corresponding to a region of interest defined by times of flight of said signals corresponding to reflections from an input object when it is within a predefined zone of sensitivity.

16. A device as claimed in claim 1 wherein said interference comprises signals or noise that could interfere with said reflections.

* * * * *